March 18, 1952  K. B. BLODGETT ET AL  2,589,983
ELECTRICAL INDICATOR OF MECHANICAL EXPANSION
Filed Nov. 5, 1947  2 SHEETS—SHEET 1

Inventors:
Katharine B Blodgett,
Vincent J. Schaefer,
by Harry P. Mayers
Their Attorney.

March 18, 1952     K. B. BLODGETT ET AL     2,589,983
ELECTRICAL INDICATOR OF MECHANICAL EXPANSION
Filed Nov. 5, 1947
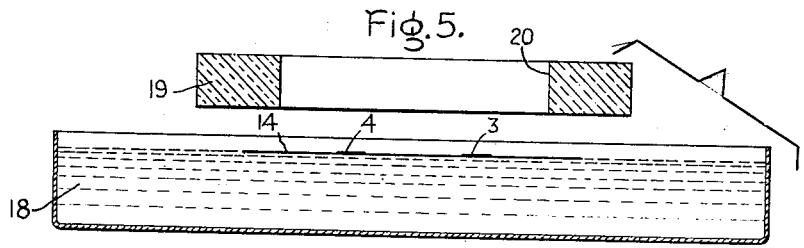
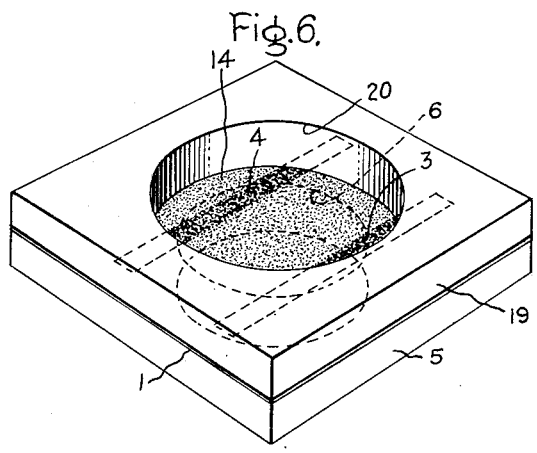
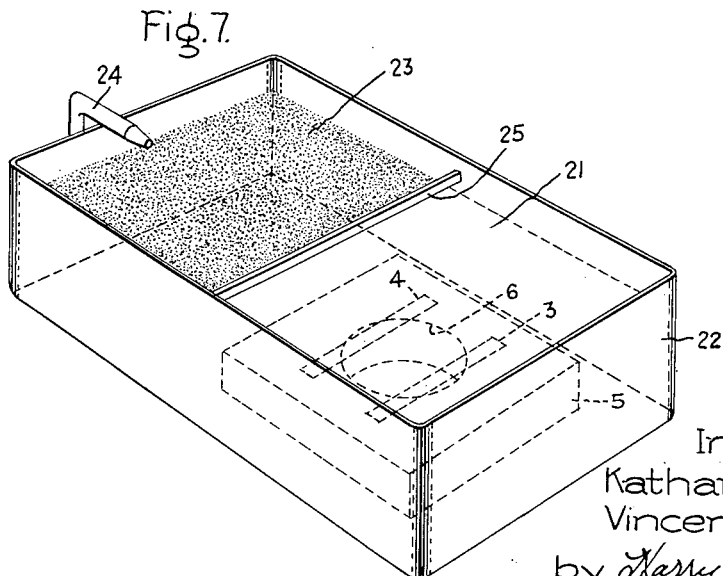
Inventors:
Katharine B. Blodgett,
Vincent J. Schaefer,
by Harry R. Mayers
Their Attorney.

Patented Mar. 18, 1952

2,589,983

UNITED STATES PATENT OFFICE 2,589,983

ELECTRICAL INDICATOR OF MECHANICAL EXPANSION

Katharine B. Blodgett and Vincent J. Schaefer, Schenectady, N. Y., assignors to General Electric Company, a corporation of New York Application November 5, 1947, Serial No. 784,289

16 Claims. (Cl. 73—88.5)

This invention relates to electrical indicators of mechanical expansion useful for numerous types of indicating devices wherein variation in some quantity desired to be indicated or measured causes expansion or contraction of a suitable member; for example, in humidity indicators, thermometers, strain gages or the like. It has for its object the provision of indicating or measuring devices improved with respect to manufacturing and operational simplicity and which utilizes simple, electrical methods of affording the desired indication. Briefly stated, this object is accomplished by coating an expandible or contractible member with a preferably very thin coating of conductive particles such as graphite and indicating or measuring the desired quantity in terms of changes in electrical resistance of the layer or coating effected by expansion or contraction thereof. It has been found that by this means, it has been possible to produce an instrument characterized by a very high ratio of resistance change to relatively small changes in dimensions of the expandible member, thereby affording a conveniently measurable indication of the desired quantity.

Figure 1:
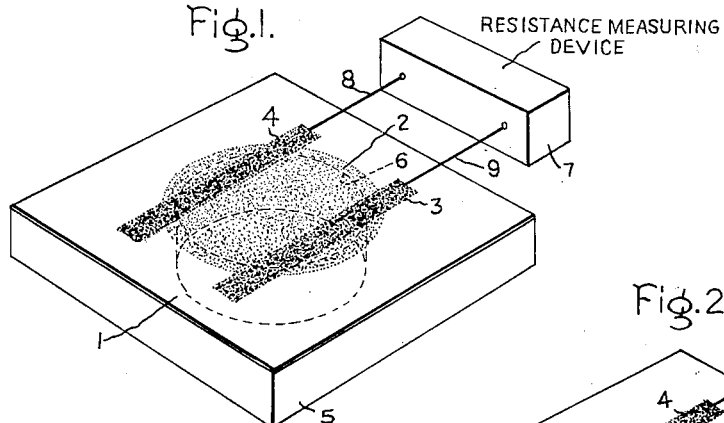
Figure 2:
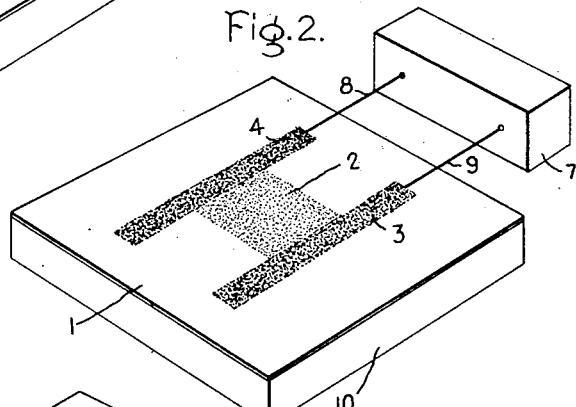
Figure 3:
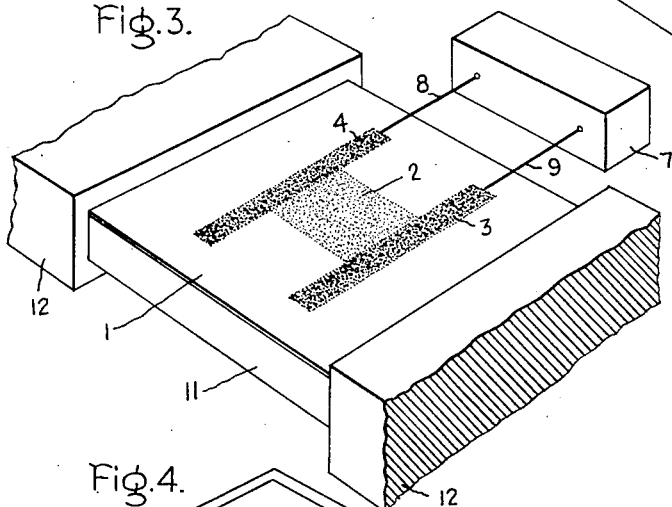
Figure 4:
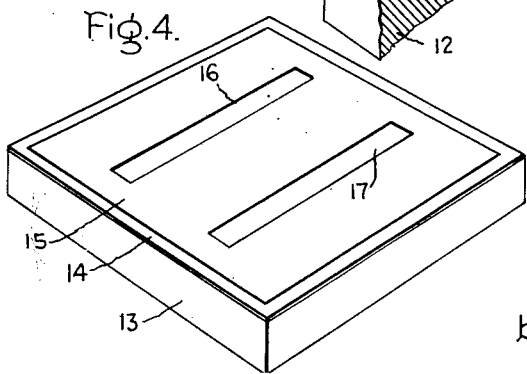

The features of the invention desired to be protected are pointed out in the appended claims. The invention itself, together with further objects and advantages thereof may best be understood by reference to the following specification when taken in connection with the accompanying drawings in which the Figure 1 represents one illustrative embodiment of the invention in a humidity indicator or detector; Figure 2 represents a similar embodiment in a thermometer; Figure 3 represents still a further embodiment within a strain gage; while the Figures 4 through 7 illustrate various steps in one process or method of making devices of the type illustrated by the Figures 1–3. In view of the substantial similarity of structure throughout the various figures, like numerals have been used to designate like parts throughout.

Referring now to the Figure 1, an essential feature of the invention is illustrated by a suitably mounted film 1 of a material, the expansion and contraction of which is responsive to the moisture content, i. e. the humidity of the surrounding medium or atmosphere. Film 1 has provided thereon a strip-like layer or coating 2 of finely divided conductive particles, the arrangement of which is such that the resistance of the layer between any two suitable terminals 3 and 4 will vary in proportion to the degree to which the film 1 is expanded or contracted in proportion to the moisture content of the surrounding medium such as the atmosphere. As one suitable moisture responsive material of which film 1 might be made, may be mentioned polyvinylformal which has been found to expand in proportion to its absorption of or contact with atmospheric moisture and to contract upon diminution of the amount of such moisture. For the coating 2, it has been found that a very thin layer of conductive particles such as flaked graphite (for example, particles having an average diameter or principal dimensions of the order of between 0.01 and 0.05 millimeter) will produce very satisfactory results.

The coating has the property that when the film stretches, i. e., increases in area, the electrical resistance measured across any area of the coating increases. Similarly when the film tightens, the resistance decreases. Preferably the coating is made in such a way that the relative change of resistance is very great compared with the relative change of length and width. As an example, a coating can be prepared for which an increase of one percent in the distance between electrodes causes a 2500 percent increase in resistance. The change of resistance with stretch of the film follows approximately a logarithmic relationship; that is, the logarithm of the resistance varies in a linear manner with the stretch. A coating having the property that has been described can be prepared by depositing a single layer of graphite particles on the film surface. They are closely spaced in the plane of the film surface. Hereinafter, a layer of this thickness is termed a "monoparticle" layer. One explanation of the large relative change of resistance with stretch, the change following approximately a logarithmic relationship, is that a certain fraction of the particles are pulled apart from each other for each increment of stretch. A possible explanation of this behavior is that before stretching occurs the particles overlap by various small amounts, ranging largely from 0 to 2 percent of the particle size.

The terminals 3 and 4 may be constructed of any suitable conductive material, for example, of graphite strips formed as hereinafter disclosed and having substantially constant resistance as compared with the variable resistance of the coating 2. To that end, they will have a considerably greater thickness than that of the coating 2 for which reason its resistance characteristics will differ substantially from the latter as will be explained more in detail hereinafter.

The film 1, together with its conductive coating 2 and terminals 3 and 4, may be mounted in any suitable manner such that at least a portion of the film 1 in the immediate vicinity of the coating 2 will be free to expand and contract in response to moisture changes in the surrounding atmosphere. For example, the film has been shown as cemented or otherwise affixed to a rigid insulating plate 5 of glass or like material having a central aperture 6 over which the working part of the film, namely, the conductive coating 2 and at least a portion of the terminals 3 and 4 will be suspended. It will be understood that with this arrangement, the portion of the film overhanging the aperture 6 will be relatively free to expand and contract as by sagging under its own weight without interference from the adjacent portions of the plate 5.

Any suitable means for providing a continuous indication of the resistance of the coating 2 may be provided and such has been illustrated generally as device 7 connected to terminals 3 and 4 by wires 8 and 9, and which may comprise, for example, a resistance measuring bridge of the type well known in the art preferably provided with a suitable dial calibrated in terms of the quantity to be indicated, i. e. humidity in the case of Figure 1.

With the foregoing arrangement, and especially if the coating 2 be constructed such that it is of mono-particle thickness, it has been found that an exceedingly great change in resistance occurs with but a minor change in the dimension of the film 1 as it expands or contracts in response to moisture changes. While the invention should not be considered as being limited by any theory of operation nevertheless, it may be stated that this action is believed to be due to the fact that the expansion or contraction of the film 1 causes a considerable separation between the individual discrete particles of the coating 2 in such manner that a great increase in the resistance between them is produced. For example, it has been found that in some cases this resistance increases roughly exponentially with the degree of expansion of the film 1 and that a 2500% change of resistance has been produced by a 1% expansion of the dimension of the film 1. Those results have been obtained with a type of flaked graphite with particle sizes estimated at the aforementioned order of magnitude. In another typical case, the resistance of the layer 2 varied from 20,000 to 1,000,000 ohms when the humidity was changed from room humidity to 100%. The change was relatively rapid suggesting that the film 1 responded almost instantaneously to the water vapor that reached it. These resistance readings were reproducible to about 10% accuracy and could be repeated a number of times. It will be observed that with a range of approximately 5,000% resistance change of this character, a reproducibility factor of 10% accuracy does not represent a substantial error.

If the thickness of the coating 2 be substantially greater than that of a single particle, then the foregoing great change in resistance will not occur and apparently this may be ascribed to the fact that when the coating is constituted by successive layers of particles, one on top of the other, the succeeding layers form conductive bridges over any gaps in those preceding. Thus the stretching of the film has no opportunity to cause substantial separation between the individual particles of the coating, therefore, the resistance change of the coating as a whole is relatively small and probably only that attributable to its general change in the configuration. The same factor will indicate just why the resistance of the terminals 3 and 4 may be made relatively constant. In the case of the terminals, the graphite is formed of many particles in thickness and thus no substantial change in the resistance of the entire terminal occurs.

The Figure 2 embodiment differs from that of the Figure 1 substantially only in the fact that in that case, the expansion of the coating 2 is brought about not by expansion of the film 1 by itself, but rather by thermal expansion of its support comprising the base member 10. It will be understood therefore, that the device of Figure 2 may be employed as a thermometer wherein the thermal expansion and contraction of the member 10 in response to changes in temperature will stretch or contract the coating 2 and thus afford a measure of the temperature change. Accordingly, in the Figure 2, the central aperture of the Figure 1 has simply been omitted. It will be understood, of course, that the coating 2, together with its end terminals 3 and 4 may be affixed to any suitable thermally expansive member forming the operating element of the thermometer.

Similarly, in the Figure 3, the resistance change in the coating 2 is brought about not by expansion of the film 1 of itself, but rather in response to changes in dimensions of its support, block 11, caused by the imposition of compressive or elongation forces for strain gage purposes. For example, the block 11 is indicated as being placed under stress by means of the jaws 12 of a suitable compressor mechanism. Alternatively, the block 11 could be placed under tension by elongated forces exerted by similar jaws clamped to opposite ends of the block 11 and having forces such as tend to pull the block apart. It will be understood, of course, that in a manner similar to that of Figure 2, the resistance of the coating 2 will be caused to change in accordance with the expansion and contraction of the block 11. That change may be measured as an indication of the degree of expansion or contraction.

It will also be understood that the film 1 may, if desired, be omitted in the Figures 2 and 3 embodiments and the terminals 3 and 4, and coating affixed directly to member 10 or block 11.

The Figures 4 through 7 illustrate steps of one method for constructing the device of the Figure 1, some of which steps may be utilized for constructing those of Figures 2 and 3. As a first step of the method, the film 1 is formed and provided with the conductive terminals 3 and 4. To that end a film of suitable material may first be coated upon a flat glass plate 13 (Figure 4) or like object by the expedient of dipping the plate into a solution of polyvinylformal in a suitable solvent, for example, ethylene dichloride. It will be found that by dipping the plate in this manner a uniform film 14 of any suitable thickness may be provided. After formation of the film 14 by the latter dipping process, a stencil 15 having cut out portions 16 and 17, corresponding to the outlines of the terminals 3 and 4 be superimposed upon the film 14 and the plate 13 as indicated. Thereafter, a conductive coating of the outline of the desired terminals 3 and 4 may be formed by suitable means as by rubbing an excess of graphite into the portions 16 and 17. This operation may be performed by hand or other suitable means and simply involves an application of a substantial quantity of powdered graphite to the open stencil portions 16 and 17 and thereafter rubbing the same into the film 14 manually or otherwise.

As the next step, means are employed to transfer the film 14 with the terminals 3 and 4 thereon to the appertured plate 5 of the Figure 1 or the corresponding members of Figures 2 and 3. To that end, the film 14 of the Figure 4 may first be detached from the forming plate 13 by dipping the latter into a body of water in such manner that the film 14 together with its attached terminals is floated uniformly on the surface of the water without wrinkling. This may readily be accomplished by controlled insertion of the plate 13 into the body of water 18 (Figure 5) from one end to the other. As a next step, the floating film is picked up upon an intermediate appertured plate 19 of glass or like material having a central aperture 20 of considerably greater diameter than the diameter of the aperture 6 in Figure 1. The aperture 20 may thus be juxtaposed to a substantially large circircular area symmetrically about contacts 3 and 4. The lower surface of the plate 19 may be coated with a suitable adhesive material such as rubber cement and thereafter gently superimposed upon the floating film 14 until the latter adheres thereto sufficiently to be lifted off of the surface of the water. At that stage it will be rigidly stretched across the bottom of the aperture 20 with the graphite terminals 3 and 4 on the side affixed to the plate.

As a next step the film 14 may be transferred to the appertured plate 5 of the Figure 1 in the manner indicated in the Figure 6. In this step the upper surface of the plate 5 of Figure 1 may be coated with a suitable adhesive cement and then brought into proximity with the film 14 stretched across the aperture 20 of the larger plate. In this operation the small aperture 6 of the plate 5 is aligned in the desired position symmetrically with respect to the terminals 3 and 4 and when pressed against the tension of the film it will cause the same to adhere thereto sufficiently so that it may be removed. If necessary, the film may be cut around the periphery of the large aperture 20 so as to release it from plate 19 after it has adhered to opposite plate 5 completely covering small aperture 6. The expedient of using two aperture plates in this manner is used in order to insure that the terminals 3 and 4 will be on the side of film 1 away from the plate 5 in the final structure. This expedient is preferable although not necessary in all cases, especially where it is found permissible to permit the terminals 3 and 4 to function on the glass side of the film 1. Alternatively, the plate 19 could be omitted and the step accomplished by passing the cement covered plate 5 into body of water 18 and under film 14 and thereafter raising it through the water surface so that it properly engages film 14. At this state the instrument of the Figure 1 is complete, except for the provision of the graphite conducting coating 2. The latter may be added by the following steps.

As a first step in applying coating 2, the instrument of the Figure 1 as completed at the end of the step illustrated by the Figure 6 is coated on its upper surface with suitable adhesive material to which the graphite particles will readily adhere. It has been found that a rubber cement comprising crepe rubber dissolved in benzene forms a suitable material for the purpose. It may be applied to the plate 5 in any suitable thickness (thickness of the order of 500 to 2000 Angstrom Units are exemplary) by floating a quantity of the cement solution or rubber solution on the surface of a smooth body of water. Its thickness may be varied by means known to those skilled in the art, for example, by controlling the quantity of the solution injected upon the water surface or by controlling the area of the water surface over which the solution is permitted to spread. In the latter connection, a mechanism similar to the barrier 25 of the Figure 7 may be employed. By moving the barrier 25 lengthwise to the tank, it will be found that the thickness of the cement solution floating on the surface of the water will be varied. Its thickness can be observed by observation of the light interference colors which are reflected therefrom in a manner well known to those skilled in the art. The floating film of cement is transferred to the surface of the plate 5 simply by dipping the latter into the water in a controlled manner. For example, the plate 5 may be lowered on to the cement film until the latter adheres thereto, thereafter it may be placed at the bottom of the tank to be used in the next step and allowed to remain there until the next step is about to be carried out.

As a next step a mono-particle layer of graphite particles may be prepared by floating graphite particles of suitable size on the surface of a smooth body of water, for example, on the surface of a body of water 21 in the tank 22 of the Figure 7. The particles 23 of graphite may be simply scattered on the surface of the water 21 and suitably agitated to the point where all of the particles individually float on the water, that is, none are superimposed upon each other. They must not be agitated in such a way as to force them under the surface or they will sink. This may be conveniently accomplished by agitating the mass of particles scattered upon the water with a steam of air or other gas, for example, from an air hose 24 attached to any suitable source of fluid pressure (not shown). It will be found that after a few moments of agitation by such an air stream the particles will settle in such a manner that each is floating individually on the surface of the water. In order to confine the particles to relatively close proximity with respect to each other, they may be pressed against each other by any suitable means, for example, the rod-like barrier 25 which is positioned at the level of the water and in contact therewith in such manner that it may be moved back and forth to compress the layer of particles in the plane of the water surface. Additionally, it will be found that the introduction of a quantity of oil which lowers the surface tension of the water (for example, oleic acid) upon the surface of the water at a point around the edges of the main body of the particles will exert a certain amount of pressure along the plane of the surface which will drive the particles into relatively close proximity with each other. As indicated in the Figure 7, the surface of the water on the righthand edge of the barrier 25 is left clear in order that the plate 5 may be conveniently inserted into the body of water and brought up under the surface of the floating particles in accordance with the step presently to be described.

The plate 5 with the coating of cement is next placed into the body of water 21 in the tank 22 of the Figure 7 below the surface, that is, below the floating film of graphite particles and it is then moved under the graphite particles smoothly so that it does not disturb the configuration thereof. Thereupon, the plate 5 is raised through the surface in such manner that a smooth coating of graphite particles will float on the plate. The water is then dried from between the plate and the particles as by drying at a low temperature (e. g. 40° C.). The particles then adhere to the rubber cement and cover the entire surface of the plate 5. Thereafter the graphite particles may be removed from all but the desired portions of the surface of the plate 5 by any suitable means. For example, they may be readily removed by wiping away with a quantity of cotton wool or paper soaked in any suitable solvent such as acetone. It will suffice if all of the particles within a rectangular strip extending from edge to edge of the plate 5 and between the terminals 3 and 4 except for that portion indicated by the coating 2 be removed in this manner. In Figure 1, it would be preferable to have the coating 2 extend from edge to edge of aperture 6, as shown. In that manner, the only resistance between the terminals 3 and 4 will constitute the narrow strip of the coating 2. If desired, the particles of graphite on the portions of the plate 5 on the outer sides of the terminals may be removed although such is not necessary since they will not contribute to the intervening resistance between the terminals so long that there is a clear path extending between the terminals and from edge to edge of the plate except for the coating 2.

As a final step, after the graphite coating 2 has been applied to the cement film the detector may be treated with ultra-violet light in order to destroy the elastic properties of the rubber cement so that they will not interfere with the normal stretching and contracting action of the film 1. This may be accomplished by any suitable means known to those skilled in the art. For example, by simple exposure to a mercury vapor lamp. It has been found that an exposure time of ten minutes with a commercial type lamp is generally sufficient to destroy nearly all of the elasticity of the cement.

It will be understood that in the case of instrument of the type of Figures 2 and 3, the steps necessary to the provision of film 1 may optionally be omitted and the contacts 3 and 4 and coating 2 provided directly on plate 5. In that case only the appropriate steps described above need be used.

The method for fabricating instruments as disclosed herein are claimed in our copending application Serial No. 784,290 filed concurrently herewith, now Patent 2,493,745, and assigned to the same assignee as the present application.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. An electrical indicator of mechanical movement comprising an expandible and contractible member having a substantially mono-particle coating of conductive particles closely spaced with respect to each other, affixed to said member and having a resistance variable with the expansion and contraction of said member.

2. An indicator as in claim 1 comprising a thermometer in which said member constitutes a thermally expansible and contractible member.

3. An electrical indicator as in claim 1 comprising a strain gage in which said member constitutes an expandible and contractible member of said gage.

4. An electrical indicator as in claim 1 in which said particles comprise graphite.

5. An electrical indicator of mechanical movement comprising an expandable and contractible member, spaced conductive terminals on said member, a mono-particle coating of conductive particles closely spaced with respect to each other affixed to said member and having a resistance variable with the expansion and contraction thereof and forming a resistance path between said terminals, and means connected to said terminals for measuring said resistance.

6. An indicator as in claim 5 comprising a thermometer in which said member constitutes a thermally expansible and contractible member.

7. An electrical indicator as in claim 5 comprising a strain gage in which said member constitutes an expandible and contractible member of said gage.

8. An electrical indicator as in claim 5 in which said particles comprise graphite.

9. An electrical indicator of mechanical movements comprising an expandible and contractible member, spaced conductive terminals on said member, a coating of conductive particles closely spaced with respect to each other affixed to said member and having a resistance variable with the expansion and contraction thereof and forming a resistance path between said terminals, said coating having a thickness substantially equal to that of a single particle, and means connected to said terminals for measuring said resistance.

10. A humidity indicator comprising a moisture responsive film of material expandible and contractible in response to the water vapor content of the medium in which it is placed, a substantially mono-particle conductive coating affixed to said film and having a resistance variable with the expansion and contraction thereof.

11. A humidity indicator comprising a moisture responsive film of a material expandible and contractible in response to the moisture content of the medium in which it is placed, a mono-particle coating of conductive particles closely spaced with respect to each other affixed to said film and having a resistance variable with the expansion and contraction thereof.

12. An indicator as in claim 11 wherein said particles comprise graphite.

13. A humidity indicator as in claim 11 including spaced conductive terminals, said coating forming a resistance path between said terminals, and means connected to said terminals for measuring said resistance.

14. A humidity indicator comprising a moisture responsive film of a material expandible and contractible in response to the moisture content of the medium in which it is placed, a coating of conductive particles closely spaced with respect to each other affixed to said film and having a resistance variable with the expansion and contraction thereof, said coating having a thickness substantially equal to that of a single particle.

15. An indicator as in claim 14 wherein said particles comprise graphite.

16. A humidity indicator as in claim 14 including spaced conductive terminals, said coating forming a resistance path between said terminals, and means connected to said terminals for measuring said resistance.

KATHARINE B. BLODGETT.
VINCENT J. SCHAEFER.

REFERENCES CITED

The following references are of record in the file of this patent:

UNITED STATES PATENTS

| Number | Name | Date |
|---|---|---|
| 2,256,642 | Gaut et al. | Sept. 23, 1941 |
| 2,438,205 | Coates | Mar. 23, 1948 |
| 2,461,310 | Cilley | Feb. 8, 1949 |
| 2,471,601 | Albright | May 31, 1949 |

FOREIGN PATENTS

| Number | Country | Date |
|---|---|---|
| 743,994 | France | Apr. 8, 1933 |

OTHER REFERENCES

Publication by A. Theis in Aircraft Engineering, April 1943, pp. 106–109, entitled "Electrical Measurement of Stresses."

Publication by H. C. Roberts in Instruments, October 1944, pp. 603–605, 626 and 628, entitled "Electric Gaging Methods."